United States Patent

Gueret

[11] Patent Number: 6,016,939
[45] Date of Patent: Jan. 25, 2000

[54] DISPENSING ASSEMBLY EQUIPPED WITH A UNIDIRECTIONAL CLOSURE MEMBER

[75] Inventor: Jean-Louis H. Gueret, Paris, France

[73] Assignee: L'Oreal, Paris, France

[21] Appl. No.: 09/023,044

[22] Filed: Feb. 13, 1998

Related U.S. Application Data

[63] Continuation of application No. 08/758,453, Nov. 29, 1996, Pat. No. 5,779,109, which is a continuation of application No. 08/326,243, Oct. 20, 1994, abandoned.

[30] Foreign Application Priority Data

Oct. 21, 1993 [FR] France ................................ 93/12562

[51] Int. Cl.⁷ .................................................. B65D 37/00
[52] U.S. Cl. ........................... 222/494; 222/92; 222/212; 222/556
[58] Field of Search ........................ 222/92, 107, 212, 222/494, 548, 556

[56] References Cited

U.S. PATENT DOCUMENTS

| | | | |
|---|---|---|---|
| 1,934,045 | 11/1933 | Devlin et al. | 222/494 |
| 1,965,812 | 7/1934 | Shippee | 221/60 |
| 2,197,672 | 4/1940 | Winters | 221/60 |
| 2,429,984 | 11/1947 | Berglund | 220/44 |
| 3,937,371 | 2/1976 | Del Bon | 222/494 |
| 4,022,464 | 5/1977 | Parker | 222/485 |
| 4,124,150 | 11/1978 | Ross | 222/494 |
| 4,412,634 | 11/1983 | Bennett | 222/519 |
| 5,161,718 | 11/1992 | Gueret . | |
| 5,197,637 | 3/1993 | Naumann | 220/207 |
| 5,267,673 | 12/1993 | Crosnier et al. | 222/321 |
| 5,779,109 | 7/1998 | Gueret | 222/494 |

FOREIGN PATENT DOCUMENTS

| | | |
|---|---|---|
| 452 196 A-1 | 10/1991 | European Pat. Off. . |
| 524 854 A-1 | 1/1993 | European Pat. Off. . |
| 1 485 950 | 5/1967 | France . |
| 2470737 | 6/1981 | France . |
| 26 37 337 | 4/1977 | Germany . |
| 15 32 471 | 3/1990 | Germany . |
| 93 07 083 | 7/1993 | Germany . |
| 81 05763 | 7/1983 | Netherlands . |
| 1 474 620 | 5/1977 | United Kingdom . |

OTHER PUBLICATIONS

French Search Report dated Jul. 21, 1994.

Primary Examiner—Joseph A. Kaufman
Attorney, Agent, or Firm—Staas & Halsey LLP

[57] ABSTRACT

An assembly for dispensing a fluid product includes a container and a dispensing head with a channel for dispensing product. The head is rotatable and includes alignable orifices for fluid communication with the container via the dispensing channel. A closure is located at a terminal part of the channel. The closure includes a flexible flap at least partially closing the terminal part, when dispensing is not taking place, moving away at least partially from the closing position by flexing under the pressure of the product being dispensed, and returning, by elasticity, to the closing position, when dispensing ceases. The flap is normally urged into the closing position by a stressing member, which is a heel formed continuously with the flap and connected in the dispensing head.

7 Claims, 6 Drawing Sheets

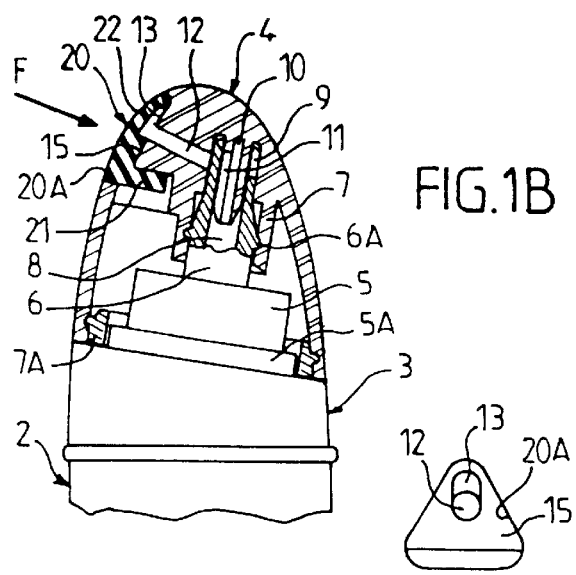
FIG.1B
FIG.1C
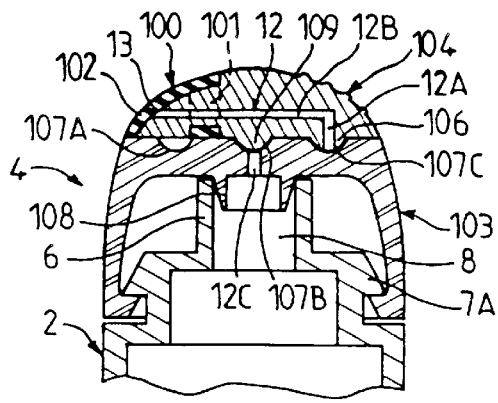
FIG.18
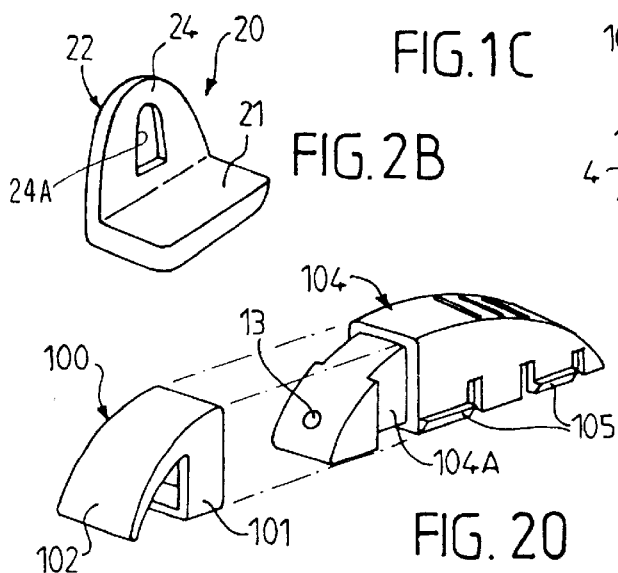
FIG.2B
FIG.20
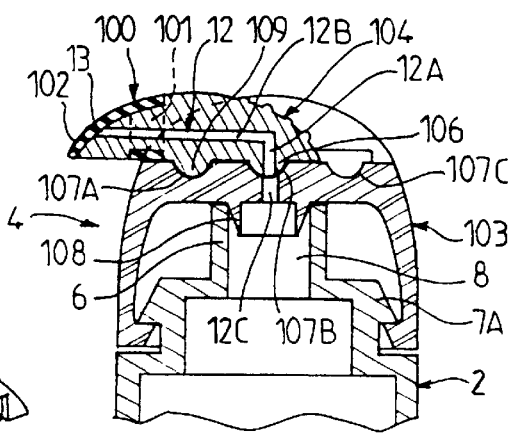
FIG.19
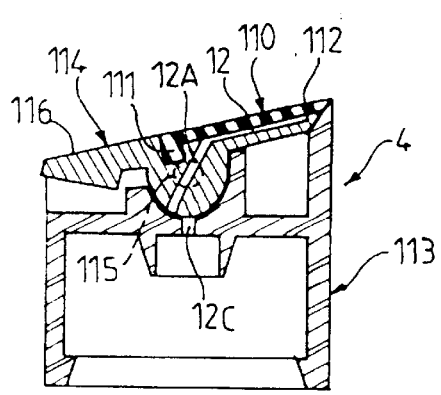
FIG.21
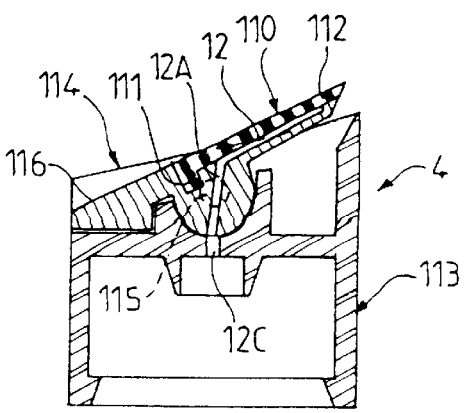
FIG.22

DISPENSING ASSEMBLY EQUIPPED WITH A UNIDIRECTIONAL CLOSURE MEMBER

This application is a continuation of prior U.S. application Ser. No. 08/758,453, filed Nov. 29, 1996, now U.S. Pat. No. 5,779,109, which was a continuation of U.S. application Ser. No. 08/326,243, filed Oct. 20, 1994, now abandoned.

BACKGROUND OF THE INVENTION

1. Field of the Invention

The present invention relates to an assembly for dispensing a fluid product in the form of a liquid or cream (or paste), such as for example, a cosmetic product.

2. Description of the Related Art

Many dispensing assemblies are known which include a container, holding the product to be dispensed, to which a dispensing head is fixed removably or non-removably. This dispensing head includes a device permitting the user to dispense the product at will, and a dispensing channel communicating, on the one hand, with the container holding the product to be dispensed and, on the other hand, with the outside.

In a known manner, the container may include a single receptacle divided by internal partitions into several compartments, each of the compartments being connected to a channel, the two channels being carried by the same dispensing head.

It is known that, after dispensing the product, part of the latter remains in the dispensing channel. This part of the product is in contact with the air during the air uptake by the dispensing head and, possibly, during storage. The product may therefore be degraded by oxidation or contaminated by impurities and microorganisms in the air and as a result, during subsequent dispensing, the product dispensed may have lost its qualities and may even have become harmful.

U.S. Pat. No. 4,124,150 shows an assembly for dispensing a fluid product which includes a container and a dispensing head containing a channel for dispensing the product to be dispensed. A closure system is located at a terminal part, opening onto the outside, of the dispensing channel. The system is formed by an obturator and by a seat, which forms part of a piece of the dispensing head. The obturator is constituted by an elastic lip in contact with the seat when dispensing is not taking place, moving away from the seat by flexing perpendicularly to the seat under the pressure of the product to be dispensed and coming back, by elasticity, into contact with the seat when dispensing ceases. The obturator is subjected to the action of a stressing member tending to keep it applied against the seat with which it interacts in order to seal the closure contact. The closure system thus constituted may be considered as being relatively sealed. However, the stressing member is formed by a kind of spring leaf which projects outwards and is relatively bulky, and the mounting of this stressing member does not seem to be very reliable.

SUMMARY OF THE INVENTION

The object of the present invention is to provide, for such dispensing assemblies, a robust and reliable unidirectional closure system which can be perfectly sealed at rest, that is to say when no dispensing of product is taking place, which opens up only under the pressure of the product to be dispensed and which has a simple construction.

Such a unidirectional closure system can be rendered aseptic, which is an advantage especially when degradable products or products not containing preservatives are dispensed; however, for many products, such as suncreams for example, such an aseptic state is not necessary. The closure system can also be used to advantage when the assembly includes a container constituted by a deformable flexible tube or bag or by a container which includes a follower piston requiring absence of air uptake. However, air uptake is necessary, the dispensing head is generally fitted with an air uptake valve in addition to the aseptic closure system, since the closure system does not permit air uptake; in this case the benefit of simplicity is lost; the invention also provides for enabling air uptake to occur and for producing a system which permits both dispensing and air uptake but which, nevertheless, prevents ingress into the product, while it is being dispensed or during storage, of accidental contamination, for example sand in the case of a suncream.

The subject of the present invention is therefore an assembly for dispensing a fluid product, which includes a container and a dispensing head containing a channel for dispensing the product to be dispensed, a closure system being located at the terminal part, opening onto the outside, of the dispensing channel, the system being formed by an obturator and by a seat, which forms part of a piece of the dispensing head, the obturator being constituted by a springy leaf at least partially in contact with the seat when dispensing is not taking place, moving away, at least partially, from the seat by flexing under the pressure of the product to be dispensed and coming back, by elasticity, into its initial position when dispensing ceases, the obturator being subjected to the action of a stressing member tending to bring it back into its initial position, wherein the springy leaf constituting the obturator forms part of a closure member made of a flexible material and the stressing member is constituted by a heel which the closure member, fixed to the dispensing head, possesses.

Advantageously, the springy leaf is set into the wall of the dispensing head, at least in the region of its closing end.

It is understood that the above mentioned sealing has to be sufficient to prevent virtually any suction of air through the closure system after dispensing of the product has ended, whatever the viscosity of the product to be dispensed when there is no air uptake; since sealing depends somewhat on the contact area between the obturator and the seat, the invention provides for choosing a contact area with a size large enough to ensure this sealing; the closure system therefore forms a valve or valve element which can open only in one direction: the direction in which the product is dispensed.

The closure system according to the invention, which, in practice, is constituted only by a small contact area between an obturator made of a flexible material and a seat, has the advantage of being able to be fitted onto all dispensing heads, whether mounted on welded tubes, follower-piston dispensers or flexible-bag dispensers or on rigid bottles. It can also be easily incorporated in dispensing heads having very variable shapes. In fact, the obturator and the piece carrying the seat of the obturator may have various shapes.

The obturator may be made of any material which can be elastically deformed. Preferably, it is made of a natural, synthetic or thermoplastic elastomer, like styrene-butadiene copolymers, nitrile rubbers, polychloroprene or neoprene, EPDM rubber, polyurethanes, silicone rubber and ethylene-vinyl acetate copolymers, for example.

Preferably, the seat is made of a rigid material.

The function of the stressing member is to keep the obturator applied against the seat during storage and to increase the pressure necessary to deform the obturator. The sealing of the closure system is thus improved. Its function is also to make it easier for the obturator to return to its closure position. Since the stressing member is constituted by a heel which the closure member possesses, it is the elasticity of the flexible material, combined with the angular arrangement existing between the directions in which extend the heel, on the one hand, and the springy leaf, on the other hand, which imparts to the springy leaf a flexural stress in the direction corresponding to pressure of the springy leaf, and therefore of its end, on the seat with which it interacts for closure of the terminal part of the dispensing channel which the seat surrounds.

When air uptake is desired, the springy leaf closes the end of the dispensing channel sufficiently to prevent the accidental penetration of impurities, but, since the springy leaf interacts with the seat in a non-sealed manner, air uptake is possible.

Advantageously, the heel has a parallelepipedal general shape; the heel possesses a long thin catching lug.

As a variant, the heel has a cylindrical general shape; preferably, the heel has an annular shape.

The heel is in two pieces.

The heel is forcibly fitted into a corresponding housing in the dispensing head.

The heel extends approximately perpendicularly to the plane in which the springy leaf extends; as a variant, the heel and the plane in which the springy leaf extends form an angle between them which differs from 90°.

The heel may be placed transversely with respect to the leaf and to the rear of it; the heel may also extend parallel to the longitudinal axis of the leaf, being in two pieces, arranged on each side of it; the heel may be close to the rear area of the leaf, and a strengthening crosspiece may connect, over part of their height close to the leaf, the two pieces constituting the heel.

The heel may also be close to the central area of the leaf.

According to one embodiment, the springy leaf possesses three portions making, in pairs, an angle between them.

Advantageously, the leaf possesses a rear part extending beyond its area of connection to the heel, the said rear part bearing on part of the dispensing head; preferably, the rear part is compressed after mounting the closure member on the dispensing head.

According to a preferred embodiment, the leaf extends, at rest, in a plane which makes an angle with a plane perpendicular to the one in which the heel extends, the said angle being greater than the one that these same planes make when the closure member is fixed to the dispensing head.

According to a variant, the dispensing channel is made partly inside the closure member.

Preferably, the dispensing head which carries the closure member is mounted on the container, being able to move with respect to it.

Advantageously, the dispensing head, which carries the closure member, possesses an external cylindrical skirt, a retaining skirt and an internal skirt, these being cylindrical, coaxial and of circular section, surrounding a hollow endpiece provided with a longitudinal cut-out, the container carrying a conduit mounted in a sealed manner between the hollow endpiece and the internal skirt, the conduit being provided with a cut-out, the dispensing channel emerging on the inside into the annular space defined between the hollow endpiece and the internal skirt in line with the cut-out of the hollow endpiece, the dispensing head thus being mounted so as to rotate on the container.

As a variant, the closure member and at least part of the dispensing channel are carried by a movable member mounted on the dispensing head so as to move with respect to it; the movable member can be moved translationally with respect to the dispensing head; the movable member is mounted so as to rotate on the dispensing head.

The dispensing head may be mounted by snap-fastening or screwing; preferably, rapid-opening means having at least one ramp permit the dispensing head of the dispensing assembly to be unfastened; such means are, for example, of the type described in FR-A-2,470,737.

The dispensing head can be molded as a single piece together with a linking film-hinge between the wall of the dispensing head and a part provided with the springy leaf. The dispensing head is advantageously made of two materials, the springy leaf being made of an overinjected material which is more flexible than the material of the body of the dispensing head.

BRIEF DESCRIPTION OF THE DRAWINGS

In order to make the subject of the invention easier to understand, an embodiment of it will now be described, by way of purely illustrative and non-limiting example, this embodiment being depicted in the appended drawings.

In these drawings:

FIG. 1A is a partial view along the arrow F of FIG. 1, the closure member not being installed;

FIGS. 1B, 1C, 2B are similar, respectively, to FIGS. 1, 1A, 2, but depict a variant;

FIG. 18 is a view in partial section of another variant of a dispensing head in the closed position;

FIG. 19 is similar to FIG. 18, the dispensing head being in the open position;

FIG. 20 is a partial view, in exploded perspective, of the dispensing head according to FIGS. 18 and 19;

FIG. 21 is a partial view of another variant of a dispensing head in the closed position;

FIG. 22 is similar to FIG. 21, the dispensing head being in the open position;

DESCRIPTION OF THE PREFERRED EMBODIMENTS

Figure 1:
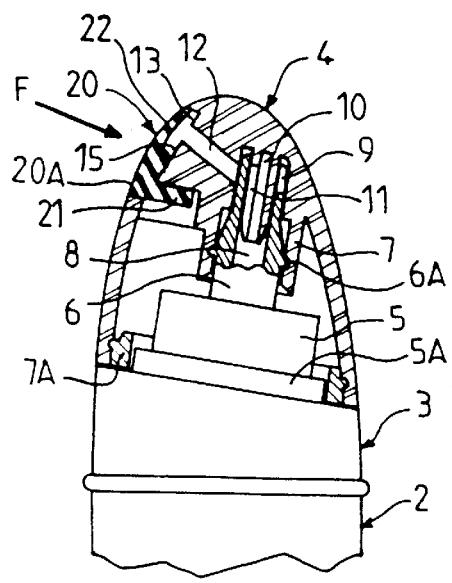
FIG. 1 is a partial view, partially in section, of a dispensing assembly according to the invention.

Referring to FIG. 1, a dispensing assembly includes a container 2, holding the product to be dispensed, having a cylindrical general shape with a non-circular, for example elliptical, section; to the upper part of the container is fastened, for example by snap-fastening, a support 3, the lower part of which matches the shape of the container 2 and the upper part of which is prolonged in a neck 5 connected by a base 5A, the neck 5 and the base 5A having circular sections, the section of the base 5A being slightly greater than that of the neck 5; the axis common to the base 5A and to the neck 5 being slightly inclined with respect to the longitudinal axis of the container 2 and of the lower part of the support 3, and this lower part is connected to the base 5A in a plane perpendicular to the plane of FIG. 1, making an angle with a plane perpendicular to the axis of the container 2.

The neck 5 itself is prolonged by a conduit 6 having the same axis and having a cylindrical shape with a circular section defining an axial passage 8; the container 2 is made of a relatively flexible plastic; on the inside, the container 2 and the support 3 are arranged so that the passage 8 is in communication with the inside of the container 2: thus, by manually compressing the container 2, it is possible to push the product held in the container 2 through the passage 8.

The dispensing assembly is topped by a dispensing head 4; more precisely, this is in the form of a hollow piece possessing, on the inside, a housing on top of the conduit 6; inside this housing, a hollow endpiece 10 is housed in the passage 8 of the conduit 6; the inside volume of the housing communicates with a dispensing channel 12 which itself communicates with a dispensing orifice 13 for dispensing the product to the outside; the dispensing channel 12 and the dispensing orifice 13 can also be seen in FIG. 1A.

The head 4 possesses a collar 7 surrounding the conduit 6 which possesses, on the outside, an annular rib 6A which is snap-fastened into a corresponding groove provided on the inside surface of the collar 7; thus, the head 4 is held axially with respect to the neck 5 and to the container 2, while still being able to rotate with respect to them; in addition, the head 4 is rotationally guided by a guide ring 7A attached to the inside of the lower part of the head 4 and interacting frictionally with the outside wall of the base 5A of the neck 5.

The dispensing channel 12 communicates with the passage 8, or not, depending on the rotational position of the head 4 with respect to the conduit 6: the hollow endpiece 10 possesses a longitudinal cut-out 11, and the conduit 6, at its upper end, possesses a longitudinal cut-out 9; in the position depicted in FIG. 1, the cutouts 11 and 9 are not facing each other but are at 180° with respect to each other and the communication between the dispensing channel 12 and the passage 8 is therefore closed; in this position too, the head 4 prolongs, in a centered manner and on the outside, the container 2 and the support 3; by rotating the head 4 through 180° with respect to the support 3 and to the container 2, starting from the position depicted in FIG. 1, the cut-outs 11 and 9 end up facing each other and the communication is established; it will be noted that the head 4 will then be inclined with respect to the axis of the container 2, by virtue of the inclination of the base 5A with which it interacts, this making it easy for the user to carry out dispensing.

Figure 2:
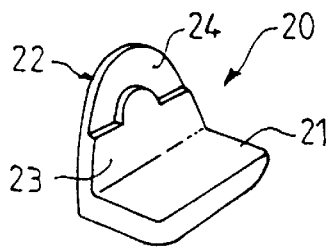
FIG. 2 is a perspective view of the closure member equipping the dispensing head of the dispensing assembly of FIG. 1, on a larger scale.

The dispensing orifice 13 is obturated by a unidirectional closure member 20; the closure member 20 is made of a springy material; as may be seen more clearly in FIG. 2, the closure member 20 possesses a springy leaf 22 and a heel 21 for fixing and stressing a leaf 22, which has a parallelepipedal general shape; according to this embodiment, the heel 21 extends approximately perpendicularly to the plane in which the springy leaf 22 extends; the closure member 20 is designed in such a way that it permits air uptake; for this purpose, the leaf 22 possesses an inside face 23, close to the heel 21, intended to interact with the seat 15 carried by the dispensing head 4 and, at its extreme end, an extreme inside face 24 which is slightly offset towards the outside and in line with which the dispensing orifice 13, bordered by a seat 15, is located;. thus, the orifice is not completely obstructed, the extreme inside face 24 being a slight distance away from it.

The springy leaf 22 and the heel 21 are, as it were, located respectively on the faces of a dihedron whose intersecting edge corresponds to the junction between leaf and heel. In the vicinity of the closing end of the leaf 22, the angular extent of this leaf, along a circumference centered on the axis of the container 2, is reduced.

The heel 21 of the closure member 20 is forcibly fitted into a housing provided in the dispensing head 4 in order to receive it; this housing extends transversely from a rabbet 20A receiving the leaf 22, the contour of which therefore matches the shape of the contour of the leaf and the bottom of which constitutes the seat 15; the construction of the closure member 20 as a single piece, together with its leaf 22 and its heel 21, permits the springy leaf 22 to be kept applied against its seat 15 by its inside face 23; in this construction, the heel 21 having the same width as the base of the leaf 22 by which it is connected to the heel 21, good results as regards keeping the leaf 22 applied against its seat have been obtained with a thickness of the heel 21 equal to twice the thickness of the leaf 22, which were respectively 2 mm and 1 mm, the height of the heel 21 being of the order of 5 times the thickness of the leaf 22, that is 5 mm, and the leaf 22 having a total height of 10 mm.

Installation of the heel 21 in the housing of the dispensing head 4 is designed so as to create a flexural stress on at least part of the leaf 22, which is thus applied elastically against the seat 15.

Advantageously, the leaf 22, at least in the region of its closing end, is set into a housing of corresponding shape in the wall of the head 4, so as to form, at rest, a smooth continuous surface with the outside surface of the head 4. Thus, at rest, in the closed position, the leaf 22, at least at its closing end, does not extend beyond the outside surface of the head 4.

It will be understood that, as regards the variants described in the present application, they may all be arranged so as to provide or not provide air uptake; thus, in order for the variant of FIGS. 1 and 2 to be fitted to a dispensing assembly without air uptake, it is sufficient for the inside faces 23 and 24 of the leaf 22 to be in one and the same plane, the plane for keeping the leaf 22 against its seat 15 carrying the dispensing orifice 13; such a construction is shown in FIGS. 1B, 1C, 2B, which are, respectively, similar to FIGS. 1, 1A, 2 described previously; according to this variant with no air uptake of FIGS. 1B, 1C, 2B, it may be seen that the leaf 22 interacts, via its face 24, with the seat 15 all around the dispensing orifice 13; as may be seen in FIG. 2B, a blind hollow 24A is made in the face 24 of the leaf 22 in line with the dispensing orifice 13 whose shape it has: this avoids the marking of the leaf by the border of the orifice 13 and permits excellent closure sealing; such an arrangement may, of course, be applied to the variants which follow.

Figure 7:
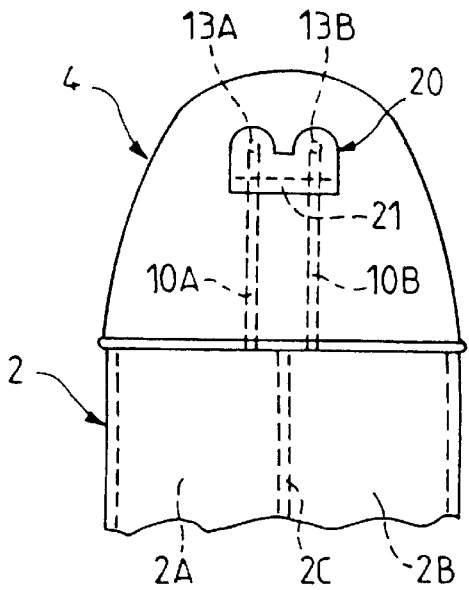
FIG. 7 is a partial view, in elevation, of a variant of a dispensing assembly according to the invention.

The closure member 20 may also be shaped so that it interacts with two dispensing orifices, as shown in FIG. 7; in this figure, the container 2 includes two compartments 2A, 2B delimited by a separating partition 2C; each compartment 2A, 2B is associated with a dispensing passage, respectively 10A, 10B, each conducting products contained in the compartments 2A, 2B towards the dispensing orifices 13A, 13B closed, at rest, by the closure member 20.

For simplicity, the other figures depicting other variants bear identical references to those of FIGS. 1 and 2 for members performing the same role as those which have been described in regard to these figures.

Figure 3:
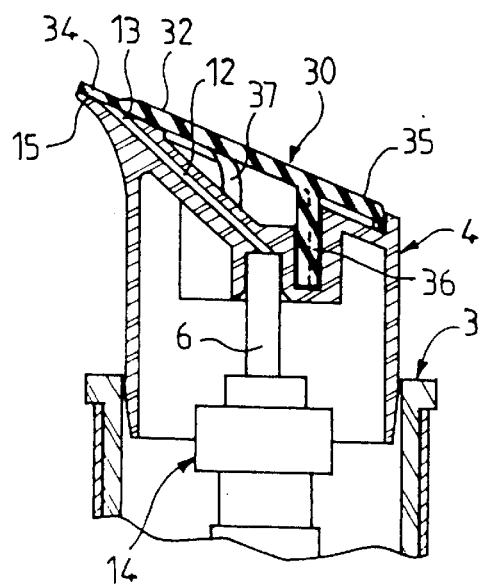
FIG. 3 is a partial view, partially in section, of a variant of a dispensing assembly according to the invention.
Figure 4:
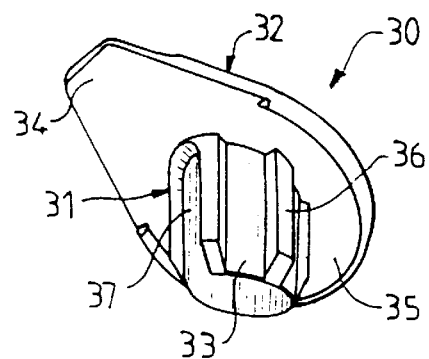
FIG. 4 is a perspective view of the closure member to equip the dispensing head of the dispensing assembly of FIG. 3, on a larger scale.

Referring to FIGS. 3 and 4, the support 3 carries a dispensing valve or pump 14, these being conventional, the conduit 6 of which constitutes the emerging rod which carries the dispensing head 4 constituting a push-button; the closure member 30 includes a springy leaf 32 and a fixing heel 31.

The heel 31 has a cylindrical annular general shape; a cylindrical wall 33 of the heel 31 is provided on the outside with longitudinal ribs 36 making it possible to increase the external surface area of the heel 31 in order for the heel 31 to be well embedded in the dispensing head 4; a longitudinal cut-out 37 permits the heel 31 to overlap the dispensing channel 12 belonging to the dispensing head 4, which possesses, at its upper part, a housing, open to the outside, for receiving the closure member 30, this housing having a shape complementary to that of the closure member 30; according to the embodiment depicted, the axis of the heel 31 and a plane in which the springy leaf 32 extends to form an angle between them which differs from 90°, of the order of 110°; the leaf 32, having the general shape of a drop of water seen in section, extends all around the heel 31 so that not only is a front part 34 defined, which interacts directly with the seat 15 but so too is a rear part 35, with respect to the heel 31, bearing on the dispensing head 4, which reinforces the action of the heel 31 in its action of stressing the leaf 32 on the seat 15. Good results have been obtained with a heel of 10 mm average length, the cylindrical surface 33 having a diameter of 8 mm, the length of the leaf 32 being 25 mm and its maximum width being 16 mm, the axis of the heel 31 making an angle of the order of 20° with the plane in which the springy leaf 32 extends.

Figure 5:
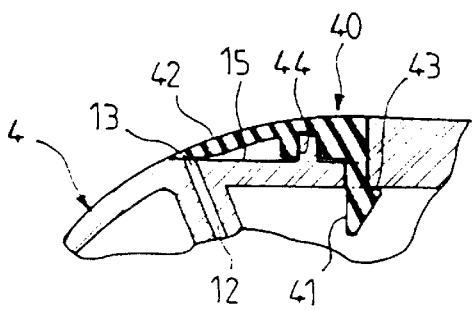
FIG. 5 is a view in partial section of a variant of a closure member according to the invention, equipping a dispensing head.
Figure 13:
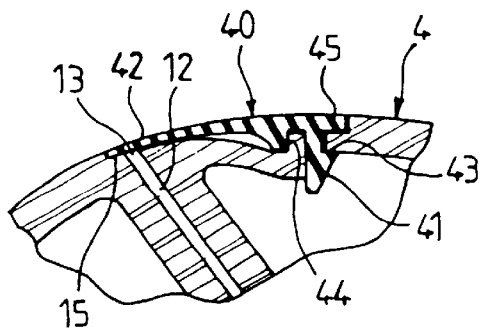
FIG. 13 is a variant with respect to FIG. 5.

The closure member 40 of FIG. 5 possesses a heel 41 having a parallelepipedal general shape located to the rear with respect to that end of a leaf 42 which interacts with the seat 15 in line with the dispensing orifice 13; the heel 41 includes a long thin lug 43 for catching on a wall of the dispensing head 4; the action of the heel 41 is furthermore reinforced by the fitting of a housing 44, which the closure member 40 possesses, over a corresponding stud carried by the dispensing head 4. The end of the leaf 42 close to the orifice 13 extends in a direction which makes an angle of the order of 70° with the direction of the heel 41. As a variant, as shown in FIG. 13, the rear part 45 of the leaf 42 of the closure member 40 extends beyond the heel 41; the bearing on and embedding in the wall of the dispensing head 4 by this rear part 45 reinforces the role of stressing member performed by the heel 41.

Figure 6:
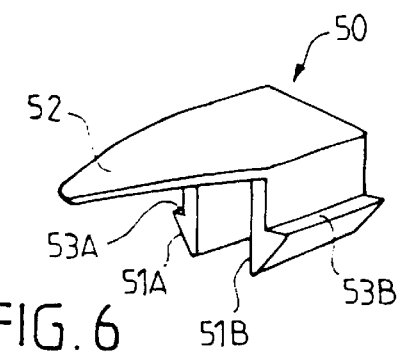
FIG. 6 is a perspective view of another variant of a closure member intended to equip a dispensing head.
Figure 8:
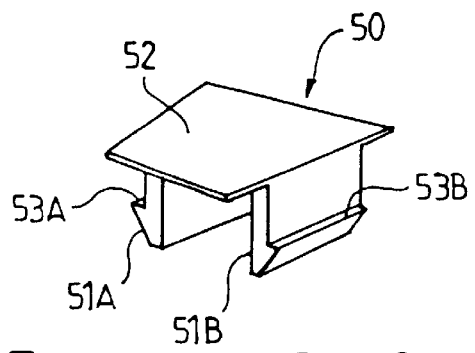
FIG. 8 is a variant of the closure member according to FIG. 6.
Figure 9:
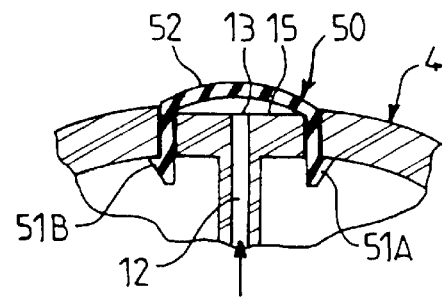
FIG. 9 is a view in partial section of the closure member of the variants of FIGS. 6, 8 and 10, during dispensing of the product.
Figure 10:
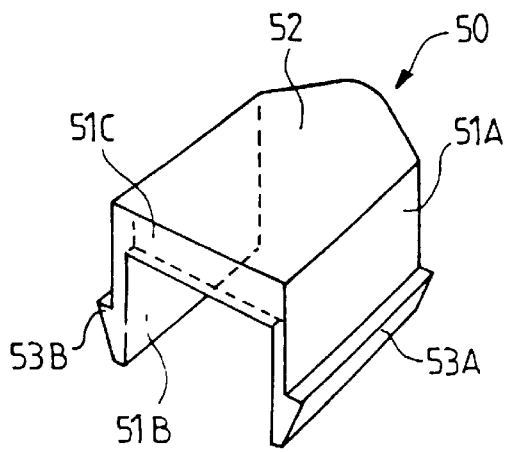
FIG. 10 is another variant of the closure member according to FIG. 6.

According to the variants of FIGS. 6, 8, 9 and 10, the closure member 50 possesses a heel in two pieces 51A, 51B, of generally parallelepipedal shape, each including a long thin catching lug 53A, 53B, like the closure member 40 of FIG. 5; however, instead of being placed transversely to the rear of a leaf 52, the heel in two pieces 51A, 51B extends parallel to the longitudinal axis of the leaf 52, on each side of it; according to FIG. 6, the heel 51A, 51B is close to the duckbill-shaped rear area of the leaf 52, whereas, in FIG. 8, the heel 51A, 51B is close to the central area of the trapezoidally-shaped leaf 52; according to FIG. 10, a strengthening transverse crosspiece 51C connects the two pieces 51A, 51B over part of their height close to the leaf 52; the embedding of the closure member 50 into the dispensing head is thereby strengthened, as is also therefore its role of stressing member for the springy leaf 52; for this variant, FIG. 9 shows the lifting up of the central part of the leaf 52, in line with the dispensing orifice 13, during dispensing of the product passing through the dispensing channel 12, symbolized by the upward-pointing arrow depicted in this figure. The heels 51A, 51B of these variants generally extend perpendicularly to the leaf 52; better stressing of the leaf 52 is obtained when the internal angle which they form with the leaf 52 is slightly less than 90° when the closure member 50 is at rest, this angle being 90° when the member 50 is mounted on the dispensing head.

Figure 11:
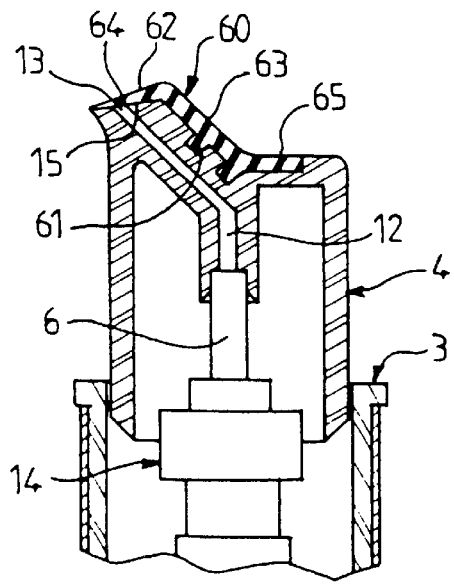
FIG. 11 is a partial view, partially in section, of a variant of a dispensing assembly according to the invention.
Figure 12:
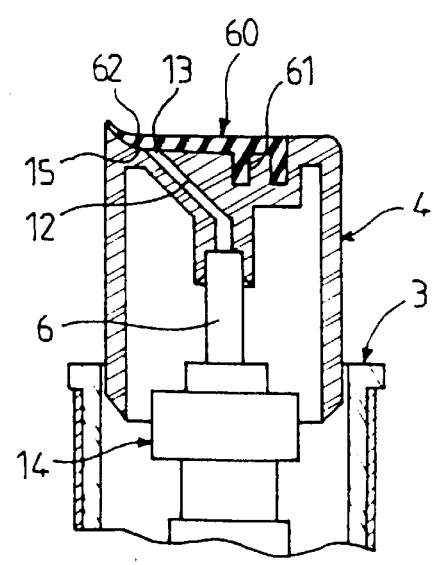
FIG. 12 is a variant with respect to FIG. 11.

According to FIGS. 11 and 12, the dispensing head 4, having the shape of a push-button for operating a dispensing valve or pump 14 carried by the support 3, includes a closure member 60, a heel 61 of which has an annular cylindrical shape and is embedded in a correspondingly-shaped housing which the dispensing head 4 possesses; according to FIG. 11, the springy leaf 62 of the closure member 60 possesses three portions 63, 64, 65 making an angle between them, one, the portion 64, interacting with the seat 15 and the dispensing orifice 13; seen from the outside, the portions 62, 63 form a convex angle of the order of 115°, whereas the portions 63, 65 form a concave angle of the order of 135°, the portion 63 carrying, on the inside, the heel 61, and the portions 64 and 65 being placed on either side of the portion 63; as in the variant of FIGS. 3 and 4, the rear portion 65 reinforces the stressing-member action of the heel 61 with regard to the leaf 62, more precisely with regard to the portion 64. According to FIG. 12, the leaf 62 has a plane general shape and only the annular cylindrical heel 61 provides the stressing action, the axis of the heel 61 making an angle of the order of 90° with that part of the leaf 62 to which it is connected and of the order of 45° with the end of the leaf 62.

Figure 14:
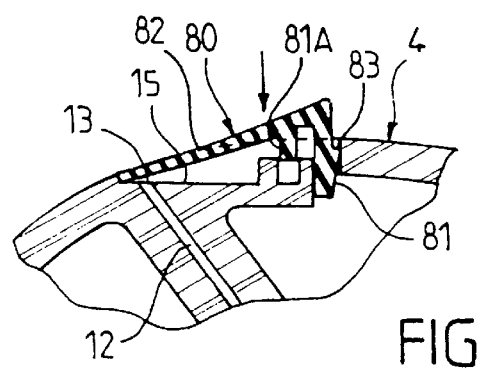
FIG. 14 is a view in partial section of another variant of a closure member according to the invention, equipping a dispensing head.
Figure 15:
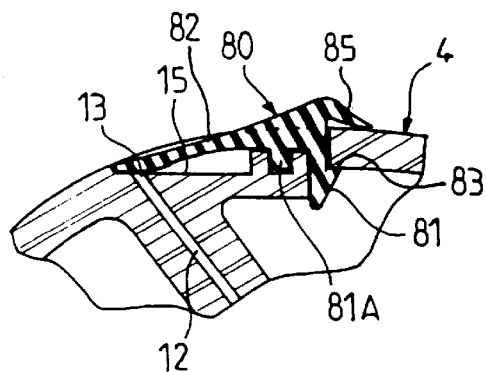
FIG. 15 is a variant with respect to FIG. 14.

According to the variant of FIG. 14, the closure member 80 possesses two fixing heels: a heel 81 having a parallelepipedal shape provided with a long thin catching lug 83 and a heel 81A in the form of a cylindrical pin, both being received in a corresponding housing in the dispensing head 4. Furthermore, according to this variant, a leaf 82 extends at rest, which position is shown in FIG. 14, in a plane which makes an angle, for example of some twenty degrees, with a plane perpendicular to that in which the heel 81–81A extends greater than the angle which these same planes make when the closure member 80 is in place, this being fixed to the dispensing head 4, the angle then being, for example, reduced by half and maintained, after mounting, by virtue of clamping the member 80 to the head 4 by the catching lug 83 of the heel 81; this arrangement has the advantage that to the "natural" action of stressing the leaf 82 by the heel 81–81A is added an action of compressing the leaf 82 against the seat 15, this leading to more effective closure of the dispensing orifice 13. This effectiveness may be further increased by providing the leaf 82 with a rear part 85 applied, also in compression, after mounting, against the external wall of the head 4, as shown in FIG. 15.

Figure 16:
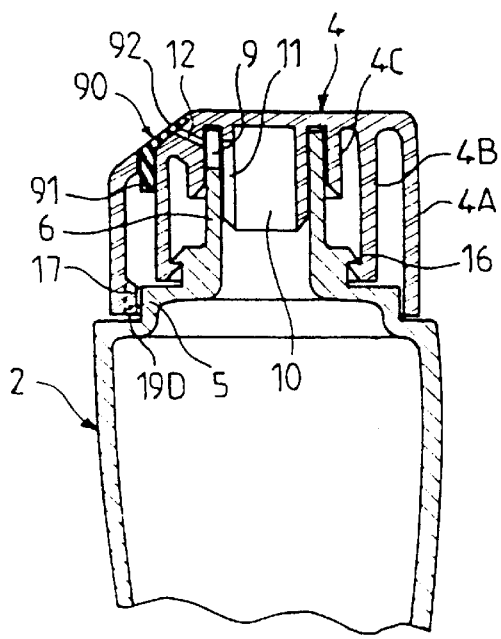
FIG. 16 is a view, partially in section, of a variant of a dispensing assembly according to the invention.
Figure 17:
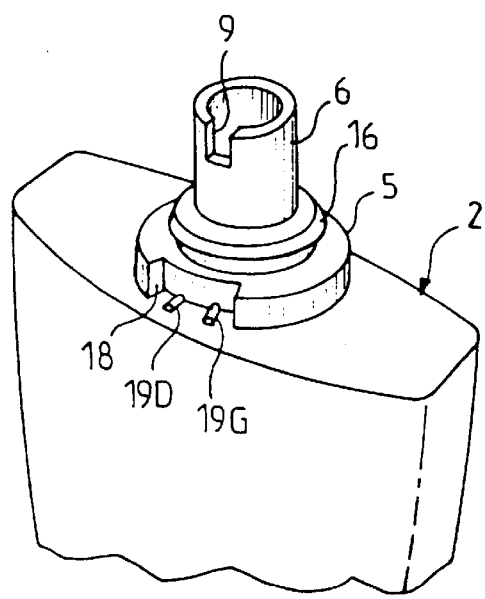
FIG. 17 is a partial perspective view of the container, by itself, of the dispensing assembly of FIG. 16.

Referring to FIGS. 16 and 17, a dispensing assembly may be seen which includes a container 2 made of a relatively flexible material; the neck 5 and the conduit 6, which have a circular section, are produced as a single piece with the container 2 which can have any section, the conduit 6 constituting a duct for the container 2; the dispensing head 4 possesses, in addition to the hollow endpiece 10, provided with its longitudinal cut-out 11, as was described in regard to FIG. 1, an external cylindrical skirt 4A having a circular section interacting, in its lower part, with the neck 5 in a guiding manner; the neck 5 is provided with a movement cut-out 18 into which is placed a radial stud 17 which the external skirt 4A carries, on the inside, in its lower part; thus, the dispensing head 4 may rotate, with respect to the container 2, within the limit of the movement of the radial stud 17 in the movement cut-out 18; the extreme positions of the stud 17 in the cut-out 18 are stabilized by positioning pins 19D, 19G which the radial stud 17 must pass, taking advantage of the elasticity of the plastic of which the dispensing head 4 is composed.

The dispensing head 4 also possesses, arranged radially between the external skirt 4A and the hollow endpiece 10, a retaining skirt 4B and an internal skirt 4C, these being cylindrical, of circular section and coaxial. The lower end of the retaining skirt 4B is clipped over a circular clipping collar 16 integral with the container 2 and placed axially between the neck 5 and the conduit 6; the diameter of the collar 16 has a value intermediate between the values of the diameters of the neck 5 and of the conduit 6. The hollow endpiece 10 and the internal skirt 4C have diameters such that they constitute an annular space in which the conduit 6 is placed in a sealed manner; the dispensing channel 12 communicates, on one side, with this annular space, in line with the cut-out 11 in the endpiece 10 and, on the other side, with the outside; for one of the extreme positions, described hereinabove, of the head 4 with respect to the container 2, the cut-outs 9 and 11 and the inner end of the dispensing channel 12 are in line with each other: in this position, depicted in FIG. 16, pressing the container 2 manually pushes the product held in the container 2 towards the dispensing channel 12; for the other extreme position of the head 4, it is a solid part of the wall of the conduit 6 which is between the channel 12 and the cut-out 11 and, consequently, any dispensing is prevented. In line with the outer end of the channel 12, which terminates in the dispensing orifice, is placed a leaf 92 of a closure member 90, a parallelepipedal-type heel 91 of which is embedded in a corresponding housing in the head 4; the closure member 90 is of the same kind as the closure member 20 described with regard to FIGS. 1 and 2; however, the closure member 90 leaf 92 extends in a plane making an obtuse angle of the order of 130° with the heel 91. The dispensing assembly which has just been described has the advantage of having a simple construction: in fact, it includes only three separate pieces, namely a container 2, a dispensing head 4 and a closure member 90.

As was seen with regard to the variants described hitherto, in the closed position of the dispensing assembly at rest, the product held in the container is isolated from the outside, on the one hand by the closure system located at the terminal part, opening out towards the outside, of the dispensing channel, and on the other hand by virtue of the closure of the communication between the dispensing channel 12 and the container 2: the communication is closed by mounting the dispensing head 4 which can move, with respect to the container 2, either rotationally (FIGS. 1 and 16, for example) or translationally (FIGS. 3, 11 and 12, for example).

Of course, it is possible to obtain this same result whatever the mounting of the dispensing head 4 on the container 2, whether in a fixed or movable manner.

Referring to FIGS. 18, 19 and 20, a dispensing assembly according to the invention includes a dispensing head 4 snap-fastened onto the container 2 by virtue of the ring 7A carried by the latter, it being possible to provide means, not depicted, for preventing the dispensing head 4 from rotating with respect to the container 2.

The dispensing head 4 includes two parts: a support 103 by means of which the dispensing head 4 is mounted on the container 2, and a movable member 104 snap-fastened to the upper part of the support 103 on which it is held by longitudinal snap-fastening feet 105 placed on each side of the movable member 104 and interacting with parallel rails arranged on either side of the support 103; thus, the movable member 104 is mounted so as to slide with respect to the support 103; when the support 103 is mounted on the container 2, an annular lip 108 of the support interacts with the edge of the conduit 6 which prolongs the neck 5 of the container 2, and seals the mounting; the upper wall of the support 103 is pierced with a passage 12C in line with the passage 8 of the conduit 6; the movable member 104, which constitutes the upper part of the dispensing head 4, is penetrated by an L-shaped dispensing channel 12 having a transverse part 12B, of which the end emerging on the outside carries the dispensing orifice 13, and an axial part 12A which emerges at the lower part of the movable member 104, in line with and at the center of a hemispherical stud 106; at the center of its lower part, the movable member 104 carries another stud 109, similar to the stud 106; cavities 107A, 107B, 107C, also hemispherical, of shape complementary to that of the studs 106, 109, are hollowed out in the upper part of the support 103; the cavity 107B is at the center, surrounding the passage 12C, and placed at an equal distance from the cavities 107A, 107C, which distance is equal to that which separates the studs 106, 109; the studs 106, 109 perform the role of positioning pins, taking advantage of the elasticity of the plastic of which the support 103 and the movable member 104 are composed; they provide the movable member with two stable positions, with respect to the support 103, when it is moved translationally with respect to it: for one position, depicted in FIG. 18, the studs 106 and 109 interact respectively with the cavities 107C and 107B; in this position, called the closed position, the axial part 12A of the dispensing channel 12 is in line with a solid part of the support 103; for the other position of the movable member 104, depicted in FIG. 19, the studs 106 and 109 interact respectively with the cavities 107B and 107A; in this position, called the open position, the axial part 12A of the dispensing channel 12 is in line with the passage 12C.

At its end near the dispensing orifice 13, the movable member 104 carries the closure member 100 including a springy leaf 102 and of a heel 101; according to this variant, the heel 101 has an annular shape and surrounds the end of the movable member 104, being placed in a groove 104A, also annular.

The variant of the dispensing head 4 depicted in FIGS. 21 and 22 is of the kind which has just been described; the dispensing head 4 includes two parts: a support 113 by means of which the dispensing head 4 is mounted on the container, and a movable member 114; according to this variant, the movable member 114 is mounted so as to rotate on the support 113, by virtue of two half-pins 115 which it carries laterally; the part 12A of the dispensing channel 12, making an oblique angle with respect to the upper part of the movable member 114, has its lower part in line, or not in line, with the passage 12C depending on the position of the movable member 114 with respect to the support 113; in one position, called the closed position, depicted in FIG. 21, the part 12A of the dispensing channel 12 is in line with a solid wall of the support 113; in the other position, obtained by acting on the rear part 116 of the movable member 114, called the "open" position, the said part 12A is in line with the passage 12C; the movable member 114 carries a closure member 110 of the kind described with regard to FIG. 16, having a springy leaf 112 and a heel 111; it will be noted that, in the closed position, that end of the movable member 114 near the leaf 112 is completely concealed and protected by the outer casing of the support 113.

For all the variants of the dispensing assembly according to the invention, the closure member is attached to the dispensing head; this operation may, of course, be performed manually, but also automatically, for example during the operation of molding the dispensing head, for example by molding with two materials at the same time, or comolding, or successively by overmolding, choosing materials which do not have physico-chemical affinity which enables the springy leaf to operate freely with respect to the seat with which it interacts.

Figure 23:
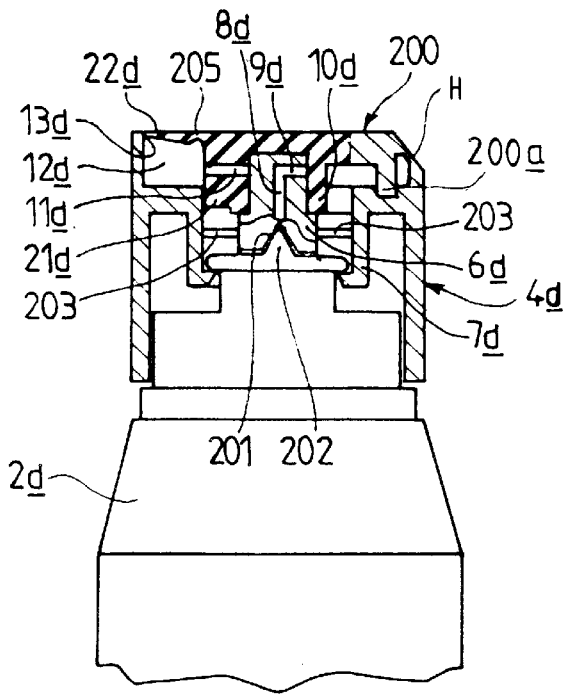
FIG. 23 shows, in axial vertical section, together with parts on the outside, a variant of a dispensing head molded as a single piece from two materials.
Figure 24:
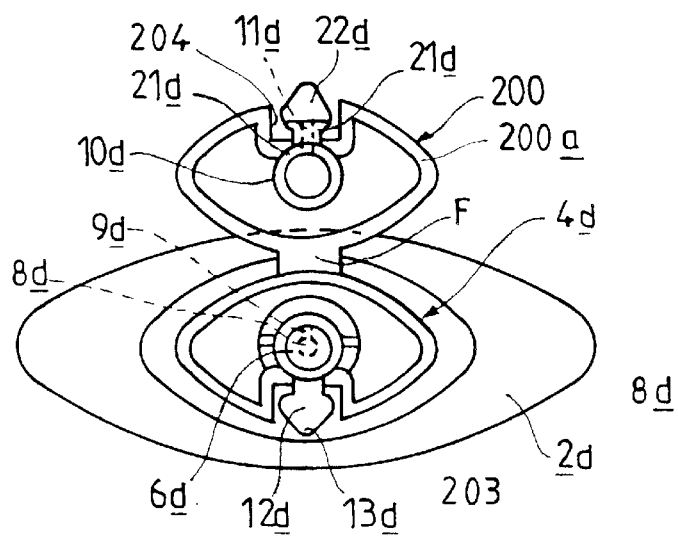
FIG. 24 is a view from above, relative to FIG. 23, of the dispensing head with the cover open.
Figure 25:
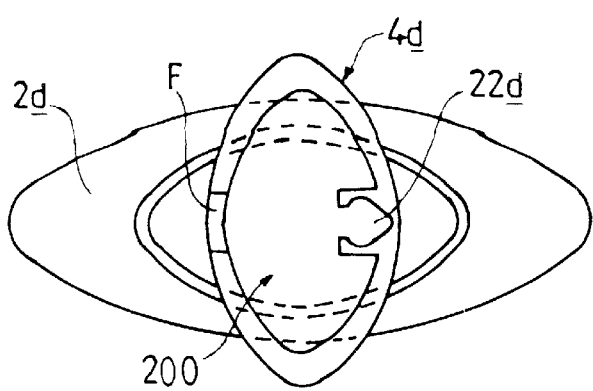
FIG. 25 is a view from above of the head of FIG. 23, with the cover turned down, while it is being rotated between the closed position and the open position.

FIGS. 23 to 25 show a dispensing head 4d molded as a single piece, which is made from two materials, advantageously with automatically breakable feet making it possible to provide inviolability before first use. This head 4d, as a variant, may be made of a single material.

The various elements of the dispensing head of FIGS. 23 to 25, similar to or performing a role similar to elements already described with regard to FIG. 1, are designated by the same numerical references followed by the letter d. They will not be described again or will be described only briefly.

The head 4d forms a single piece with a cover 200 which is connected via at least one film-hinge H to the side wall of the dispensing head 4d.

In the particular embodiment illustrated in the drawings, the head 4d is bordered by a cylindrical skirt having an oval cross-section. The head 4d is integral with an inside collar 7d suitable for being fixed, by snap-fastening, to a rim of the neck of the container 2d.

A conduit 6d, coaxial with the collar 7d, is located radially inside the latter, this conduit 6d including, on the inside, the passage 8d for the product. The base of the conduit 6d includes one or more cut-outs 201 suitable for being on top of complementary blocking members 202 provided on the neck of the container 2d, in order to stop the conduit 6d from rotating relative to the container 2d.

The conduit 6d is connected to the internal wall of the collar 7d via uniformly-spaced automatically breakable radial feet 203.

The cover 200, located at the upper part of the head 4d, has a shape, which is oval in the example depicted, corresponding to that of the cross-section of the head 4d.

A peripheral skirt 200a is provided which projects under the cover 200 in order to interact with a matching housing in the head 4d and to keep the cover in its turned-down position of FIG. 23.

The cover 200 includes, projecting at the center of its lower face, a hollow endpiece 10d provided with a longitudinal channel 11d passing through its wall. When the cover 200 is turned down onto the head 4d, as illustrated in FIG. 23, the endpiece 10d sits on top of the upper end of the conduit 6d in a sealed manner. The passage 8d emerges, to the outside, via a longitudinal channel 9d, at right angles to the passage 8d. The channel 9d may be made to face the channel 11d, or be diametrically opposed, as illustrated in FIG. 23, by a rotational movement of the head 4d.

This head 4d includes a dispensing channel 12d extending radially along one minor half-axis of the oval cross-section, between the external wall of the conduit 6d and a dispensing orifice 13d.

The cover 200 includes a springy leaf 22d located in line with the dispensing orifice 13d in order to close it. This springy leaf 22d is located in a cut-out 204 provided at one end of the minor axis of the cover 200. The leaf 22d is connected, at its rear part, via a hinge 205 to a part of the cover constituting the heel 21d. This heel preferably includes a downwardly projecting part received in a housing lying between the external wall of the conduit 6d and the wall 7d. If necessary, the heel 21d may encompass part of the endpiece 10d located opposite the part 21d.

The head 4d, together with its cover 200, made as a single piece, may be molded, in the position with the cover open, as illustrated in FIG. 24, from a single material. Advantageously, the head 4d is comolded, for example with polypropylene for the head 4d and that part of the cover 200 located opposite the leaf 22d, while the combination of the leaf 22d of the heel 21d and of the endpiece 10d is made of an elastomeric material, overinjected onto the polypropylene part of the cover 200.

The operation of the dispensing head 4d of FIGS. 23 to 25 is obvious from the preceding explanations.

When stored, the cover 200, as illustrated in FIG. 23, turned down on the head 4d, lies in an angular position relative to the conduit 6d such that the longitudinal channels 11d, 9d are diametrically opposed. The outlet for the product is thus closed. The inviolability feet 203 link the conduit 6d to the skirt of the head 4d.

When using it, the user must rotate the head 4d through 180° about the axis of the container, so as to fracture the automatically breakable feet 203 and to bring the longitudinal channels 9d and 11d into the prolongation of each other. This movement is illustrated in FIG. 25 which depicts the cover 200 substantially in a mid-course position. It should be noted that, during this movement, the conduit 6d remains motionless relative to the bottle 2d since it is stopped by the interaction of the elements 201, 202.

When the 180° rotational movement of the cover 200 has been completed, the device is ready for use and pressure exerted on the walls of the container 2d causes the product to be expelled through the channels 9d, 11d, the passage 12d and the dispensing orifice 13d, with slight lifting of the leaf 22d. When the pressure on the walls of the container 2d ceases, the leaf 22d resumes its closed position due to the stress exerted by the heel 21d.

Figure 26:
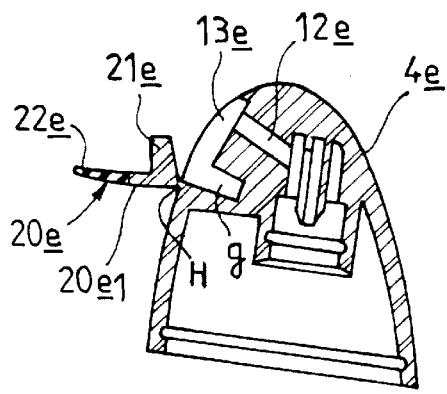
FIG. 26 is a diagrammatic view, in vertical axial section, of a variant of the head of FIG. 1, molded as a single piece.

FIG. 26 illustrates an embodiment variant 4e of the dispensing head of FIG. 1, in which variant the closure member 20e is molded as a single piece together with the head 4e. The part 20e1 of the closure member, close to the head 4e, which part includes the heel 21e, may be produced from the same material as the head 4e, for example from polypropylene; it is connected to the wall of the head 4e via a film-hinge H. The molding is carried out in the completely open position illustrated in FIG. 26 so that, after demolding, it is convenient to place the member 20e in its working position by rotating it clockwise, according to FIG. 26, in order to bring the heel 21e into engagement in a housing g in the head 4e. That part of the member 20e furthest away from the hinge H constitutes the springy leaf 22e. Advantageously, this leaf 22e is made of an elastomeric material or, more generally, a springy material, overinjected onto the rear part 20e1. The springy leaf 22e can be made of materials other than elastomer, for example a thermoplastic or a material known commercially by the name PROFAX.

Figure 27:
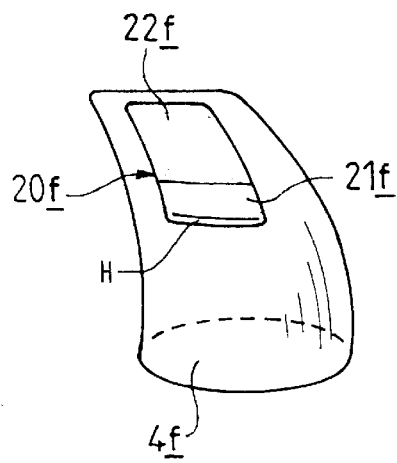
FIGS. 27 and 28 illustrate diagrammatically, in perspective, another embodiment variant of the head, molded as a single piece.
Figure 28:
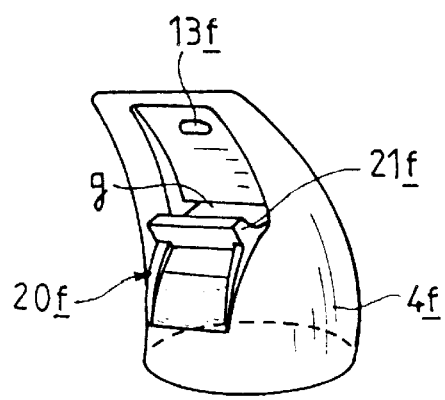

FIGS. 27 and 28 illustrate another embodiment variant. The dispensing head 4f is beak-shaped and possesses a vertically oriented face on which a rectangularly contoured closure member 20f is provided. This closure member is molded as a single piece in the open position together with the head 4f to which it is connected via a film-hinge H. On demolding, the heel 21f lies outside the housing g provided in the head 4f for receiving it, as illustrated in FIG. 28. By turning the closure member 20f down against the face of the head 4f, the configuration of FIG. 27 is obtained, this ensuring correct operation of the head 4f. The outlet orifice 13f for the product (see FIG. 28) lies in the vicinity of the upper edge of the head 4f, at mid-width. This orifice 13f is covered when the closure member 20f is turned down, as illustrated in FIG. 27. The rear part 21f of the member 20f may be made of the same material as the head 4f to which it is connected via the hinge H, while the springy leaf 22f is made of an overinjected springy material.

Figure 29:
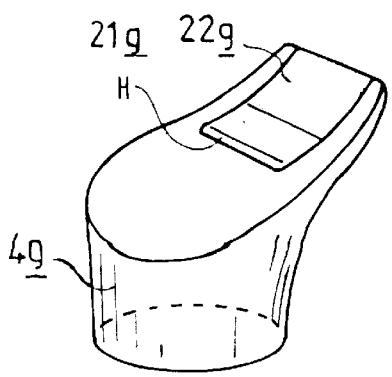
FIGS. 29 and 30 show, also in perspective, another embodiment variant of the dispensing head.
Figure 30:
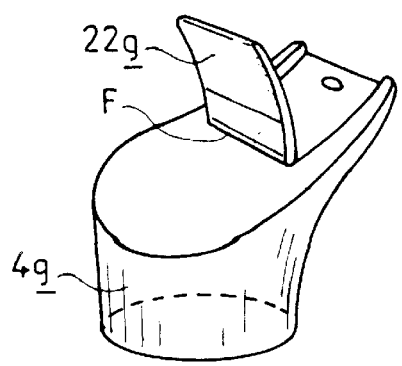

FIGS. 29 and 30 illustrate an embodiment variant of the dispensing head 4g, the closure member 22g of which is similar to that of FIGS. 27 and 28. However, the upper wall of the head 4g is substantially horizontal and the closure member 22g lies substantially in a horizontal plane in the working position, whereas, in the case of FIG. 27, the closure member 20f, in the working position, is located substantially in a vertical plane.

I claim:

1. Assembly for dispensing a fluid product, comprising:
   (a) a container for the fluid product;
   (b) a dispensing head connected to the container and including a channel for dispensing the product and a seat, the dispensing channel including a terminal part opening to outside of the dispensing head; and
   (c) a closure member connected to the dispensing head at the terminal part of the dispensing channel, the closure member having a front portion and a rear portion formed continuously therewith, a flexible flap at the front portion, and a stressing member in the form of a heel extending from the rear portion at an angle relative to the flap, the heel is spaced from the flap and the heel is received by the dispensing head,
   wherein the flap is at least partially in a contact position with the seat when dispensing is not taking place, moving away, at least partially, from the seat by flexing under pressure of the product being dispensed and returning, by elasticity, to the contact position when dispensing ceases,
   wherein the stressing member normally urges the flap into the contact position, and
   wherein the dispensing head is rotatingly mounted on the container between a first position, wherein the dispensing orifice is in fluid communication with the container, and a second position wherein the fluid communication is cut off.

2. The assembly as recited in claim 1, wherein the dispensing head surrounds a hollow endpiece provided with a longitudinal first cut-out, and the container includes a conduit provided with a second cut-out, the dispensing channel communicating with the conduit and the hollow endpiece, when the dispensing head is in the first position.

3. The assembly as recited in claim 2, wherein the head further comprises an external cylindrical skirt, a retaining skirt and an internal skirt, each being cylindrical, coaxial, of circular section and surrounding the hollow endpiece.

4. The assembly as recited in claim 3, wherein the conduit is mounted in a sealed manner between the hollow endpiece and the internal skirt.

5. Assembly for dispensing a fluid product, comprising:
   a container; and
   a dispensing head containing a channel for dispensing the product and a closure located at a terminal part opening to an outside of the dispensing channel, the closure including an obturator and a seat which is part of the dispensing head, the obturator including a springy leaf at least partially in contact with the seat when dispensing is not taking place, moving away, at least partially, from the seat by flexing under the pressure of the product and returning by elasticity, to its initial position when dispensing ceases, the obturator being subjected to the action of a stressing member tending to return the obturation to its initial position, wherein the spring leaf is made of flexible material and the stressing member includes a heel which fixed to the dispensing head,
   wherein the dispensing head is rotatingly mounted on the container.

6. Dispensing assembly according to claim 5, wherein the dispensing head further comprises an external cylindrical skirt, a retaining skirt and an internal skirt, each being cylindrical, coaxial and of circular section, and surrounding a hollow endpiece provided with a first cut-out, the container carrying a conduit mounted in a sealed manner between the hollow endpiece and the internal skirt, the conduit being provided with a second cut-out, the dispensing channel emerging into an annular space defined between the hollow endpiece and the internal skirt in line with the first cut-out.

7. Assembly for dispensing a fluid product, comprising:
   (a) a container;
   (b) a dispensing head rotatingly connected to the container and including a channel for dispensing the product and a seat, the dispensing channel including a terminal part opening to outside of the dispensing head; and
   (c) a closure member connected to the dispensing head at the terminal part of the dispensing channel, the closure member having a front portion and a rear portion formed continuously therewith, a flexible flap at the front portion, and a stressing member in the form of a heel made as one piece with the flap extending from the rear portion at an angle relative to the flap, the heel being spaced from the flap and the heel being fixedly received by the dispensing head, wherein the heel is the only element responsible for stressing of the flap and fixation of the closure member to the head, wherein the flap is at least partially in a contact position with the seat when dispensing is not taking place, moving away, at least partially, from the seat by flexing under pressure of the product being dispensed and returning, by elasticity, to the contact position when dispensing ceases, and wherein the dispensing head is rotatable between a first position wherein the dispensing orifice is in fluid communication with the container, and a second position wherein the fluid communication is cut off.

* * * * *